(12) United States Patent
Chae et al.

(10) Patent No.: US 9,354,475 B2
(45) Date of Patent: May 31, 2016

(54) LIQUID CRYSTAL DISPLAY DEVICE AND METHOD FOR MANUFACTURING THE SAME

(71) Applicant: Samsung Display Co., Ltd., Yongin, Gyeonggi-Do (KR)

(72) Inventors: Soo-Jung Chae, Seoul (KR); Sung-Man Kim, Seoul (KR); Young-Je Cho, Asan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 14/509,121

(22) Filed: Oct. 8, 2014

(65) Prior Publication Data

US 2015/0261048 A1 Sep. 17, 2015

(30) Foreign Application Priority Data

Mar. 14, 2014 (KR) ........................ 10-2014-0030110

(51) Int. Cl.
*G02F 1/1343* (2006.01)
*G02F 1/1333* (2006.01)

(52) U.S. Cl.
CPC .................... *G02F 1/134363* (2013.01); *G02F 2001/133357* (2013.01); *G02F 2001/134372* (2013.01)

(58) Field of Classification Search
CPC .................. G02F 1/134327; G02F 1/13439
See application file for complete search history.

(56) References Cited

U.S. PATENT DOCUMENTS

| 2007/0273819 A1 | 11/2007 | Kawasaki et al. |
| 2009/0046230 A1 | 2/2009 | Sakurai et al. |
| 2010/0296042 A1 | 11/2010 | Yonemura |
| 2012/0218501 A1* | 8/2012 | Lee ................... G02F 1/134309 349/139 |
| 2013/0188116 A1* | 7/2013 | Jeon ................... G02F 1/133512 349/106 |

FOREIGN PATENT DOCUMENTS

| KR | 1020110068272 A | 6/2011 |
| KR | 1020120051964 A | 5/2012 |
| KR | 10-1260666 B1 | 4/2013 |
| KR | 1020130060603 A | 6/2013 |

* cited by examiner

*Primary Examiner* — Donald Raleigh
(74) *Attorney, Agent, or Firm* — Cantor Colburn LLP

(57) ABSTRACT

A liquid crystal display device includes a first substrate, a first electrode on the first substrate, and a second electrode on the first substrate, spaced apart from the first electrode and overlapping at least a part of the first electrode. the second electrode includes a plurality of branch electrodes, and a coupling portion which couples the plurality of branch electrodes to each other. The coupling portion includes a longitudinal coupling portion extended in a length direction of the branch electrode and a transverse coupling portion extended in a width direction of the branch electrode. An edge portion of the first electrode is disposed between at least one of the plurality of branch electrodes and the longitudinal coupling portion, in a plan view.

12 Claims, 9 Drawing Sheets

(A)　　　(B)

LIQUID CRYSTAL DISPLAY DEVICE AND METHOD FOR MANUFACTURING THE SAME

This application claims priority to Korean Patent Application No. 10-2014-0030110, filed on Mar. 14, 2014, and all the benefits accruing therefrom under 35 U.S.C. §119, the content of which is incorporated herein in its entirety by reference.

BACKGROUND

1. Field

Exemplary embodiments of the invention relate to a liquid crystal display device with improved light transmission and a manufacturing method thereof.

2. Description of Related Art

A liquid crystal display ("LCD") is drawing attention as a flat panel display because the LCD can be manufactured in the form of a thin flat panel and has advantages of good portability and low power consumption.

In general, LCDs are driven using the properties of optical anisotropy and polarization of liquid crystals. A liquid crystal has a relatively long and thin shape, and thus shows a director of molecular arrangement. An orientation of the molecular arrangement may be controlled by forcibly applying an electric field to the liquid crystal.

In order to improve light transmission and viewing angle of such LCDs, a variety of arrangement methods of liquid crystal molecules and driving methods have been developed. For example, an LCD in which a pixel electrode and a common electrode are disposed in one display substrate is particularly receiving attention.

SUMMARY

One or more exemplary embodiment of the invention is directed toward a liquid crystal display device having improved light transmission.

Further, one or more exemplary embodiment of the invention is directed toward a liquid crystal display device including an increased number of branch electrodes.

According to an exemplary embodiment of the invention, a liquid crystal display device includes: a first substrate; a first electrode on the first substrate; and a second electrode on the first substrate, spaced apart from the first electrode and overlapping at least a part of the first electrode. The second electrode includes a plurality of branch electrodes, and a coupling portion which couples the plurality of branch electrodes to each other. The coupling portion includes a longitudinal coupling portion extended in a length direction of the branch electrodes, and a transverse coupling portion extended in a width direction of the branch electrodes. An edge portion of the first electrode is disposed between at least one of the plurality of branch electrodes and the longitudinal coupling portion, in a plan view.

The liquid crystal display device may further include a planarization layer between the first substrate and the first electrode. In the plan view, the first electrode may expose a portion of the planarization layer between the longitudinal coupling portion and the branch electrode, and the exposed portion of the planarization layer may not overlap the first electrode.

The exposed portion may have a concave groove cross section shape.

A depth of the groove may be about 0.1 micrometer (μm) to about 0.3 μm with respect to an upper surface of the planarization layer.

A thickness of the planarization layer may be about 1.5 μm to about 3 μm.

The liquid crystal display device may further include a data line on the first substrate, and a blocking layer on the planarization layer and overlapping the data line.

The blocking layer may include a same material as the first electrode.

The first electrode may be a pixel electrode and the second electrode may be a common electrode.

The liquid crystal display device may further include a thin film transistor on the first substrate. The thin film transistor may be coupled to the first electrode.

According to another exemplary embodiment of the invention, a method of manufacturing a liquid crystal display device includes: forming a first electrode on a first substrate; and forming a second electrode on the first electrode to be spaced apart from the first electrode. The second electrode includes a plurality of branch electrodes, and a coupling portion which couples the plurality of branch electrodes to each other. The coupling portion includes a longitudinal coupling portion formed in a length direction of the branch electrode and a transverse coupling portion formed in a width direction of the branch electrode. An edge portion of the first electrode is disposed between at least one of the plurality of branch electrodes and the longitudinal coupling portion, in a plan view.

The forming the second electrode may include: applying a second electrode-forming material on the first electrode and insulated from the first electrode; and selectively removing a portion of the second electrode-forming material to form a cutout portion at the edge portion of the first electrode.

The method may further include forming a planarization layer on the first substrate before the forming the first electrode. In the plan view, the first electrode may expose a portion of the planarization layer between the longitudinal coupling portion and the branch electrode, and the exposed portion of the planarization layer may not overlap the first electrode.

The exposed portion of the planarization layer may be formed to have a concave groove cross section shape.

The method may further include forming a data line on the first substrate before the forming the first electrode. The forming the first electrode may include forming a blocking layer on the planarization layer corresponding to the data line.

According to one or more exemplary embodiment of the invention, a liquid crystal display device may achieve improved light transmission by increasing the number of branch electrodes of a second electrode and exposing a part of an organic layer on a lower portion of a first electrode.

The foregoing summary is illustrative only and is not intended to be in any way limiting. In addition to the illustrative embodiments, and features described above, further embodiments, and features will become apparent by reference to the drawings and the following detailed description.

BRIEF DESCRIPTION OF THE DRAWINGS

The above and other features of the invention will be more clearly understood from the following detailed description taken in conjunction with the accompanying drawings, in which.

DETAILED DESCRIPTION

Figure 1:
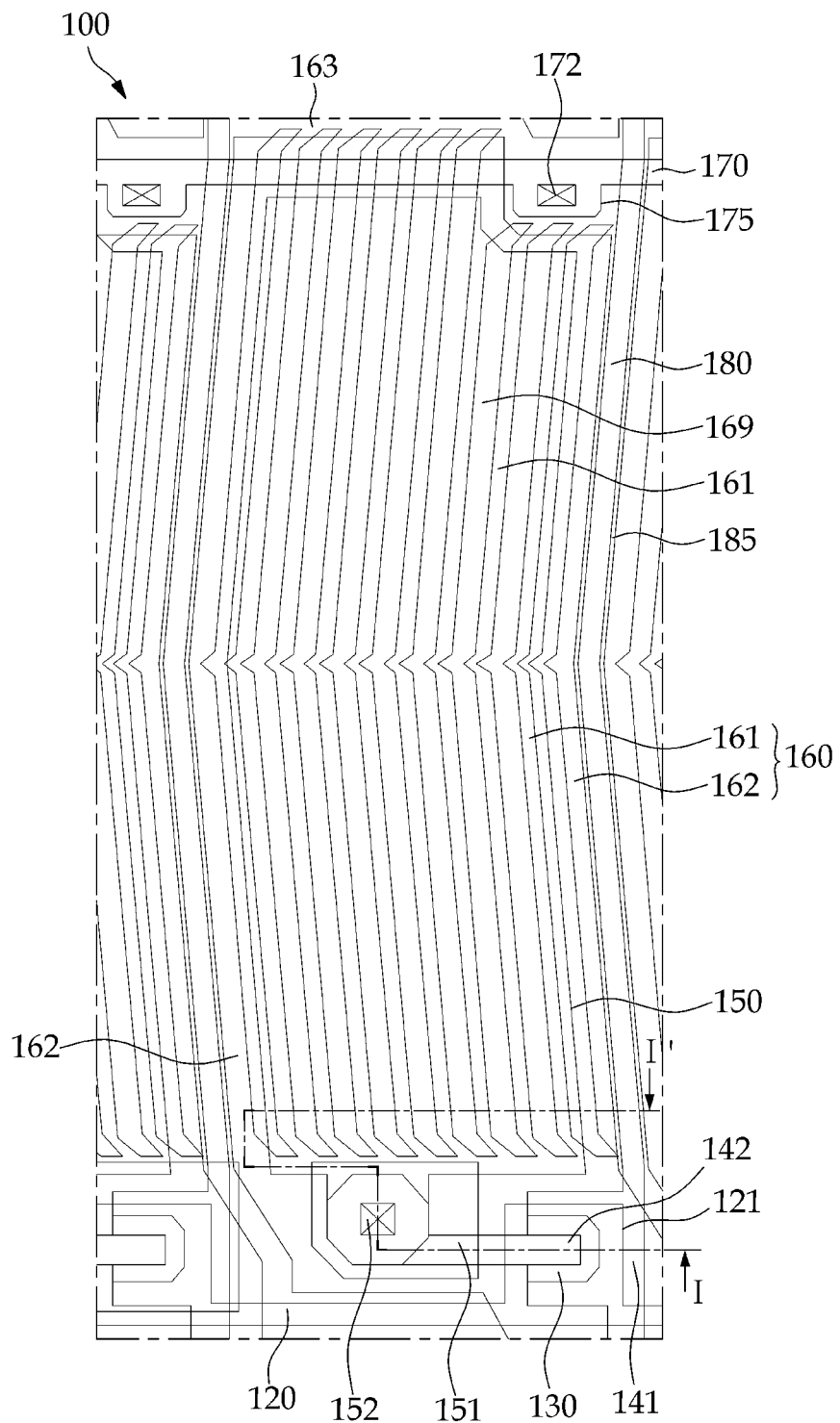
FIG. 1 is a plan view showing an exemplary embodiment of a liquid crystal display device according to the invention.

Hereinafter, exemplary embodiments of the invention will now be described in detail with reference to the accompanying drawings. The invention may, however, be embodied in many different forms and should not be construed as being limited to the exemplary embodiments set forth herein. Rather, these exemplary embodiments are provided so that this disclosure will be thorough and complete, and will fully convey the scope of the invention to those skilled in the art.

In the drawings, certain elements or shapes may be simplified or exaggerated to better illustrate the invention, and other elements present in an actual product may also be omitted. Thus, the drawings are intended to facilitate the understanding of the invention. Like reference numerals refer to like elements throughout the specification.

In addition, when a layer or element is referred to as being "on" another layer or element, the layer or element may be directly on the other layer or element, or one or more intervening layers or elements may be interposed therebetween. As used herein, connected may refer to elements being physically and/or electrically connected to each other. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "under" relative to other elements or features would then be oriented "above" relative to the other elements or features. Thus, the exemplary term "under" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be described in detail with reference to the accompanying drawings.

Hereinafter, an exemplary embodiment of a liquid crystal display device according to the invention will be provided with reference to FIGS. 1 and 2.

FIG. 1 is a plan view showing an exemplary embodiment of a liquid crystal display ("LCD") device according to the invention. FIG. 2 is a cross-sectional view taken along line I-I' of FIG. 1.

The LCD device 100 includes first and second substrates 110 and 210 facing each other, and liquid crystals 310 forming a liquid crystal layer interposed between the first and second substrates 110 and 210. The first substrate 110 and elements thereon may collectively form a first display substrate, the second substrate 210 and elements thereon may collectively form a second display substrate, and the liquid crystal layer is between the first and second display substrates.

The first substrate 110 includes transparent glass, plastic, or the like.

A gate line 120 and a gate electrode 121 protruding therefrom are disposed on the first substrate 110. A common line 170 is disposed roughly parallel to the gate line 120 and a contact electrode 175 is disposed to protrude from the common line 170. The gate line 120 is configured to transmit a gate signal and the common line 170 is configured to transmit a common signal.

The gate line 120, the gate electrode 121, the common line 170 and the contact electrode 175 may include at least one selected from aluminum (Al), silver (Ag), copper (Cu), molybdenum (Mo), chromium (Cr), tantalum (Ta) and titanium (Ti), and may have a multilayer structure in which two or more conductive layers that are different from each other in physical or chemical properties are laminated.

A gate insulating layer 125 including silicon nitride (SiNx), silicon oxide (SiOx), or the like is disposed on the gate line 120 and the gate electrode 121. The gate insulating layer 125 may have a multilayer structure including two or more insulating layers that are different from each other in physical or chemical properties.

A semiconductor layer 130 is disposed on the gate insulating layer 125. The semiconductor layer 130 may include amorphous silicon or polysilicon, or may include a semiconductive oxide. The semiconductor layer 130 overlaps at least a part of the gate electrode 121.

An ohmic contact layer 135 is disposed on the semiconductor layer 130. The ohmic contact layer 135 may include a material such as hydrogenated amorphous silicon which is doped with phosphorus (P), etc. or may include silicide.

A source electrode 141, a drain electrode 142 and a data line 180 including a conducting material are disposed on the semiconductor layer 130 and the gate insulating layer 125.

The source electrode 141, the drain electrode 142 and the data line 180 may include the same conducting material as the gate line 120 and the gate electrode 121, or may include a different conducting material.

In detail, the source electrode 141, the drain electrode 142 and the data line 180 may include at least one refractory metal selected from molybdenum (Mo), chromium (Cr), tantalum (Ta) and titanium (Ti). The source electrode 141, the drain electrode 142 and the data line 180 may have a multilayer structure that includes a refractory metal layer and low resistance conductive layer. The multilayer structure may include, for example, a double layer including a chromium or molybdenum (an alloy thereof) lower layer and an aluminum (an alloy thereof) upper layer, and a triple layer including a molybdenum (an alloy thereof) lower layer, an aluminum (an alloy thereof) intermediate layer, and a molybdenum (an alloy thereof) upper layer, but the invention are not limited thereto. The material of the source electrode 141, the drain electrode 142 and the data line 180 may include any of a number of many different metals or conducting materials suitable for the purpose described herein, besides the above-described materials.

The data line 180 may include a terminal part configured for connection to a different layer or an external driver circuit (not shown). The data line 180 transmits a data signal, and intersects the gate line 120 and the common line 170. The data line 180 may include a bent portion in order to improve light transmission of an LCD device, and referring to FIG. 1, the data line 180 may be bent in a V-shape in a central portion of a pixel area of the LCD device.

In one exemplary embodiment, the pixel area may be defined by the data line 180 and the gate line 120, but the invention is not limited thereto. In an exemplary embodiment, the pixel area may be defined by a black matrix disposed on the first substrate 110 and/or the second substrate 210.

The source electrode 141 extends from the data line 180 and is disposed on the semiconductor layer 130. The drain electrode 142 is spaced apart from the source electrode 141 and is disposed on the semiconductor layer 130.

A thin film transistor ("TFT") includes the gate electrode 121, the source electrode 141, the drain electrode 142 and the semiconductor layer 130. A channel of the TFT is formed by a portion of the semiconductor layer 130 exposed between the source electrode 141 and the drain electrode 142.

A passivation layer 145 is disposed on the data line 180, the source electrode 141, the drain electrode 142 and the exposed portion of the semiconductor layer 130.

The passivation layer 145 may include a silicon-based insulating material such as silicon nitride (SiNx) or silicon oxide (SiOx), or may also include an organic insulation material such as a polymer resin. Further, the passivation layer 145 may have excellent insulating properties and may have a multilayer structure including inorganic and organic layers in order to protect the exposed semiconductor layer 130. The passivation layer 145 may have a cross-sectional thickness of about 500 nanometers (nm) or more.

A planarization layer 146 may be disposed on the passivation layer 145. The planarization layer 146 is configured to planarize a light transmission area where first and second electrodes 150 and 160 overlap each other. The planarization layer 146 may also include a silicon-based insulating material such as silicon nitride (SiNx) or silicon oxide (SiOx), or may include an organic insulation material such as a polymer resin. The planarization layer 146 may have a cross-sectional thickness of about 1.5 micrometers ($\mu$m) to about 2.5 $\mu$m.

A contact hole 152 is defined in the passivation layer 145 and the planarization layer 146, and exposes the drain electrode 142.

The first electrode 150 is disposed on the planarization layer 146. The first electrode 150 is connected to the drain electrode 142 via the contact hole 152. In the illustrated exemplary embodiment according to the invention, the first electrode 150 acts as a pixel electrode connected to the TFT in the LCD device 100, but the invention is not limited thereto.

The first electrode 150 may include a transparent conducting material such as polycrystalline, monocrystalline, or amorphous indium tin oxide ("ITO"), indium zinc oxide ("IZO") or aluminum doped zinc oxide ("AZO"). The first electrode 150 illustrated in FIG. 1 has a planar shape and a pair of bent side portions.

A shielding layer 185 spaced apart from the first electrode 150 and overlapping the data line 180 in the plan view is disposed on the planarization layer 146. The shielding layer 185 is configured to block interaction between the data line 180 and the second electrode 160 so as to reduce or effectively prevent parasitic capacitance between the data line 180 and the second electrode 160. The shielding layer 185 may include the same material as the first electrode 150. In an exemplary embodiment of manufacturing a display device, the shielding layer 185 may be formed together with the first electrode 150 by a same process, such that the shielding layer 185 includes the same material as the first electrode 150 and is disposed in a same layer as the first electrode 150.

An insulating layer 147 is disposed on the first electrode 150 and the shielding layer 185. The insulating layer 147 may include a silicon nitride (SiNx) or a silicon oxide (SiOx), and may have a multilayer structure that includes inorganic and organic layers.

The second electrode 160 is disposed on the insulating layer 147. The second electrode 160 is connected to the common line 170 via the contact electrode 175, and thus a common voltage may be applied to the second electrode 160. A contact hole 172 is defined in the passivation layer 145, the planarization layer 146 and the insulating layer 147 so that the second electrode 160 and the contact electrode 175 are connected to each other via the contact hole 172. In the illustrated exemplary embodiment according to the invention, the second electrode 160 acts as a common electrode in the LCD device 100, but the invention is not limited thereto.

The second electrode 160 may include a transparent conducting material such as polycrystalline, monocrystalline, or amorphous ITO, IZO or AZO. The liquid crystal display device may include a plurality of second electrodes 160 respectively disposed in pixels or pixel areas thereof, second electrodes 160 included in adjacent pixels are connected to each other.

The second electrode 160 overlaps at least a part of the first electrode 150 and includes a plurality of branch electrodes 161. In an exemplary embodiment of manufacturing a display device, a second electrode-forming material is applied on the insulating layer 147, and then the applied second electrode-forming material is selectively removed from the insulating layer 147, thereby forming a plurality of cutout portions 169, and as a result the plurality of branch electrodes 161 may be formed or defined by the plurality of cutout portions 169.

The second electrode 160 further includes coupling portions 162 and 163 configured to couple the plurality of branch electrodes 161 to each other. The coupling portions 162 and 163 include a longitudinal coupling portion 162 placed extended in a length direction of the branch electrode 161 and a transverse coupling portion 163 placed extended in a width direction of the branch electrode 161. The coupling portions 162 and 163 are coupled to branch electrodes 161 of second electrodes 160 included in adjacent pixels. As used herein, the length direction is a direction in which the data line 180 extends and the width direction is a direction in which the gate line 120 extends.

The cutout portions 169 are disposed in an area corresponding to the first electrode 150. A cutout portion 169 is also disposed and extends to overlap an area corresponding to the first electrode 150, such as at an edge of the first electrode 150, and an area outside the first electrode 150.

One end or edge portion of the first electrode 150 is disposed between at least one of the branch electrodes 161, such as an outermost branch electrode 161, and the longitudinal coupling portion 162. The planarization layer 146 is exposed by the cutout portion 169 defined at the area corresponding to the first electrode 150 such as the edge of the first electrode and the area outside first electrode 150. In other words, an exposed portion 181 of the planarization layer 146 is disposed between the longitudinal coupling portion 162 and the branch electrode 161 and does not overlap the first electrode 150.

Consequently, the exposed portion 181 of the planarization layer 146 has a shape of a groove that is recessed from an upper surface of the planarization layer 146, in a cross-sectional view. The groove has a depth of about 0.1 µm to about 0.3 µm with respect to the upper surface of the planarization layer 146.

As described above, a cutout portion 169 overlaps one end or edge portion of the first electrode 150, thereby increasing the number of the branch electrodes 161 and the number of the cutout portions 169, and at least a part of the planarization layer 146 is exposed to increase an area that is not covered by the first and second electrodes 150 and 160 so that transmission of light radiated from a light source increases.

The second substrate 210 includes transparent glass, plastic, or the like.

A plurality of color filters 220 are disposed on the second substrate 210 and can be divided or defined by a black matrix 230. Each color filter 220 can display any one of red, green, and blue, or other colors.

The black matrix 230 divides and separates the plurality of color filters 220 from each other, may define a pixel area, and also reduces or effectively prevents light leakage.

An insulating layer 240 is disposed on the color filter 220 and the black matrix 230. The insulating layer 240 may include an inorganic or organic insulation material, reduce or effectively prevent the color filter 220 from being exposed, and provide a planarized surface. In an exemplary embodiment, the insulating layer 240 may be omitted.

A spacer (not shown) is disposed between the first and second substrates 110 and 210, and is configured to support the first and second display substrates and secure a space therebetween.

Liquid crystals 310 of the liquid crystal layer are arranged in the space secured by the spacer. Where a voltage is not applied to the first and second electrodes 150 and 160, a long axis of a liquid crystal 310 may be disposed parallel to the first substrate 110. The long axis of the liquid crystal 310 may also be spirally twisted at 90 degrees from a direction of the branch electrode 161 on the first substrate 110 to the second substrate 210.

When a data voltage is applied to the first electrode 150 and a common voltage is applied to the second electrode 160, an electric field is generated between the first and second electrodes 150 and 160 and the liquid crystal 310 is rotatably arranged in response to the electric field. Polarization of light passing through the liquid crystal 310 varies depending on the rotating direction of the liquid crystal 310.

Figure 2:
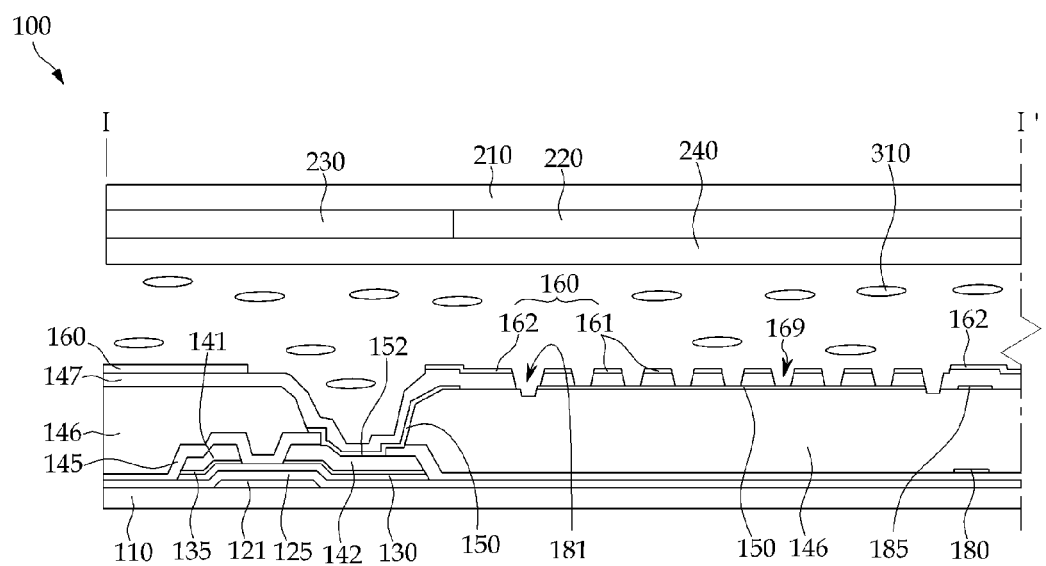
FIG. 2 is a cross-sectional view taken along line I-I' of FIG. 1.

Referring to FIG. 2, the black matrix 230 and the color filter 220 are each disposed on the second substrate 210 within the second display substrate, but the invention is not limited thereto. The black matrix 230 may be disposed on the first substrate 110 and in the first display substrate, and similarly the color filter 220 may be disposed on the first substrate 110 and in the first display substrate. In one exemplary embodiment, for example, in a color filter on array ("COA") in which a color filter is disposed on a TFT substrate, the color filter 220 is disposed on the first substrate 110 where a TFT is disposed. For a black matrix on array ("BOA") in which a color filter and a black matrix are each disposed on a TFT substrate, the black matrix 230 and the color filter 220 are disposed on the first substrate 110 where a TFT is disposed.

Hereinafter, a comparative example of an LCD device 200 will be described with reference to FIGS. 3 and 4.

Figure 3:
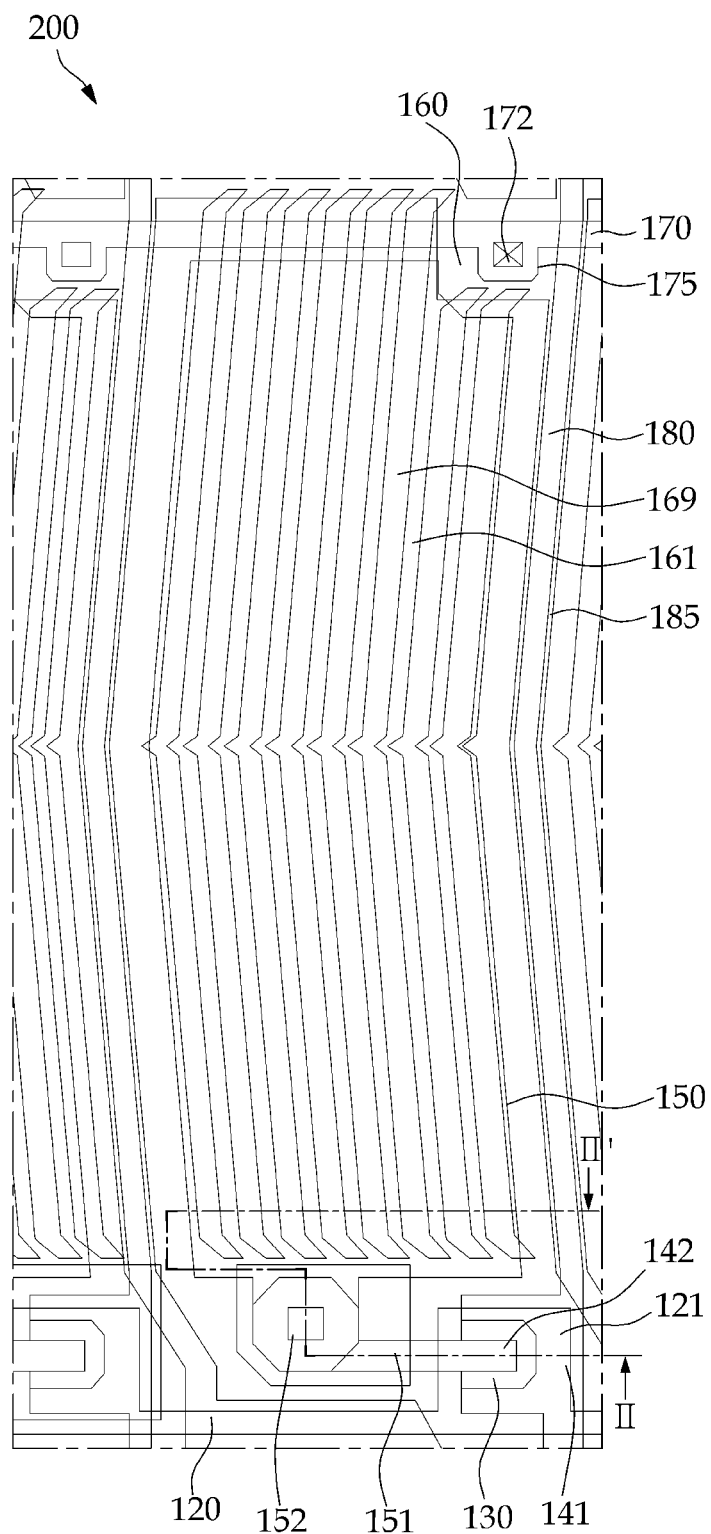
FIG. 3 is a plan view showing a comparative example of a liquid crystal display device.
Figure 4:
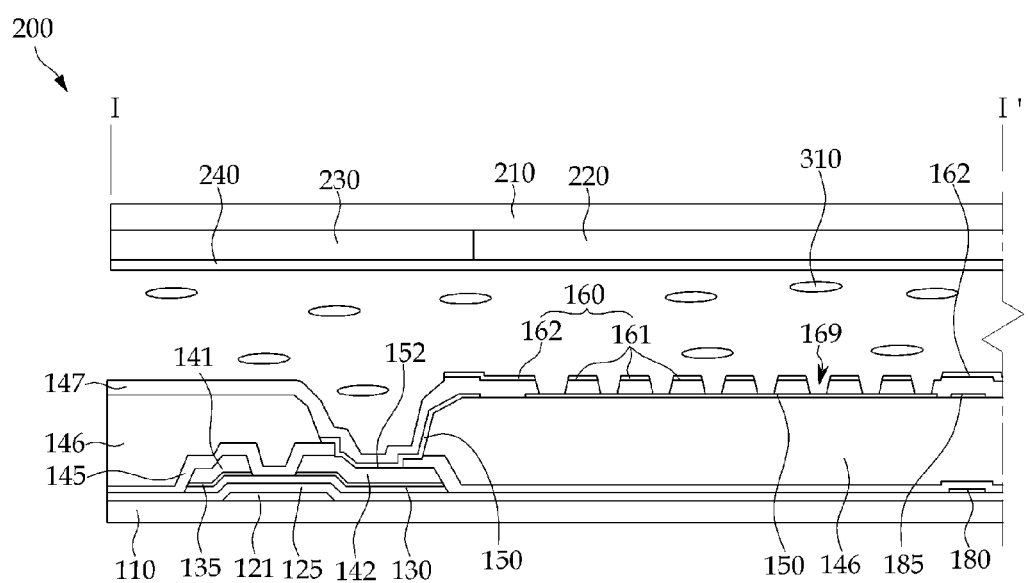
FIG. 4 is a cross-sectional view taken along line II-II' of FIG. 3.

FIG. 3 is a plan view showing a comparative example of an LCD device. FIG. 4 is a cross-sectional view taken along line II-II' of FIG. 3.

The comparative example of an LCD device 200 is substantially the same as the exemplary embodiment of the LCD device 100 according to the invention illustrated in FIGS. 1 and 2 except for the number and position of cutout portions 169. In the comparative example of the LCD device 200, cutout portions 169 are disposed only in an area corresponding to (e.g., overlapping) a first electrode 150. Consequently, the comparative example of the LCD device 200 is deficient by at least one cutout portion 169 and one branch electrode 161 when compared to the exemplary embodiment of the LCD device 100 according to the invention illustrated in FIGS. 1 and 2. Further, a planarization layer 146 disposed under the first electrode 150 is not exposed because the cutout portions 169 are disposed only in the area corresponding to the first electrode 150.

Figure 5:
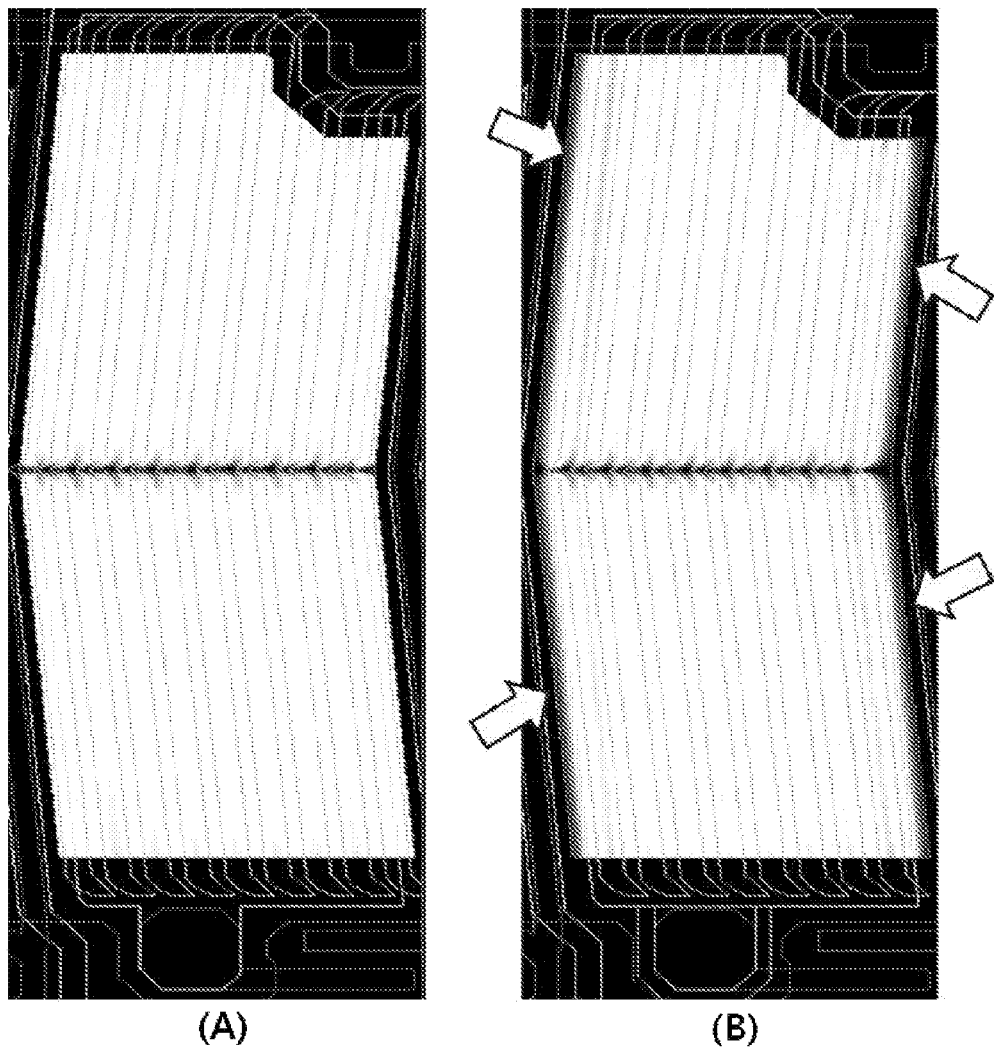
FIG. 5 provides photographs of an exemplary embodiment of a liquid crystal display device according to the invention and the comparative example of the liquid crystal display device.

FIG. 5 provides photographs of brightness of LCD devices (A) and (B) according to the exemplary embodiment according to the invention and the comparative example, respectively. In FIG. 5, the LCD device (A) of the exemplary embodiment according to the invention emits bright light (e.g., white areas) all over the pixel area, whereas the LCD device (B) of comparative example is blurred (e.g., gray area) in parts marked with arrows.

Below is Table 1 showing test results of light transmittance of the LCD devices of the exemplary embodiment according to the invention and the comparative example. The light transmittance is measured by a simulation using Techwiz 3D multi-dimensional Simulation Software by SANAYI System Co., Ltd.

TABLE 1

| Detail | Aperture Ratio | Transmittance (3D) | Comparison of Transmittance | Absolute Transmittance | Driving Voltage (ΔV) |
|---|---|---|---|---|---|
| Exemplary Embodiment | 62.63% | 22.79% | 113.3% | 4.13% | 5.2 V |
| Comparative Example | 62.63% | 20.29% | 100.0% | 3.68% | 5.2 V |

In Table 1, the transmittance (3D) represents simulation results and the absolute transmittance in percent (%) is actual transmittance converted based on the simulation results. The drive voltage represents a voltage difference between the first and second electrodes 150 and 160 when a common voltage (Vcom) of 5.5 volts (V) is applied to the second electrode 160.

Figure 6:
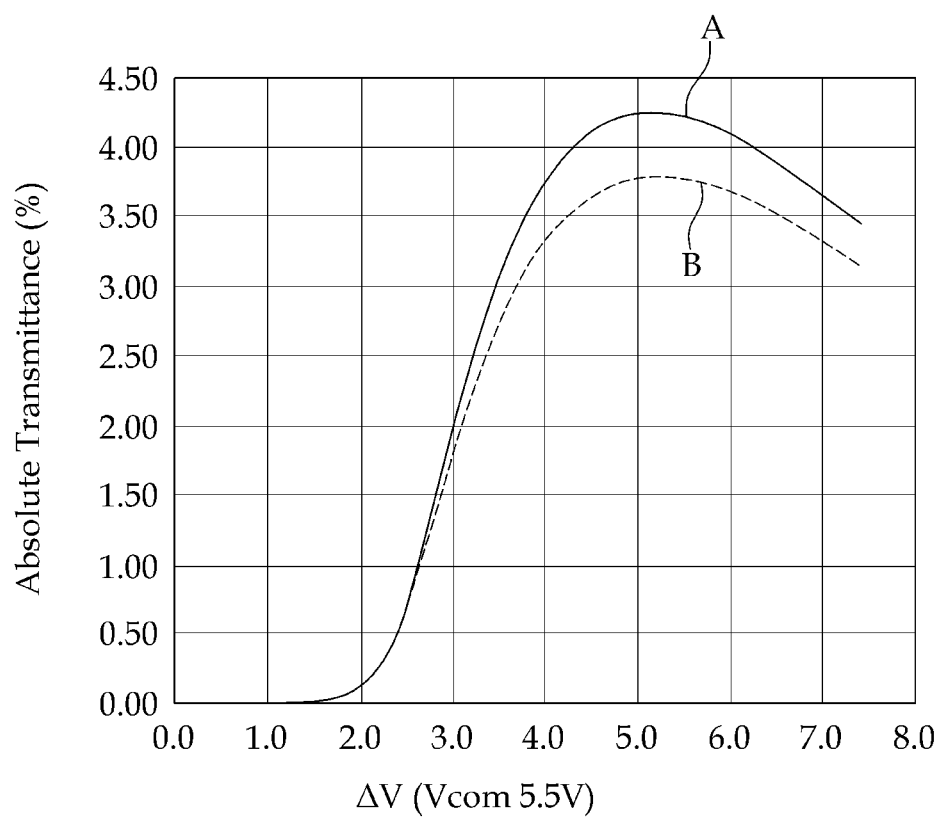
FIG. 6 provides a graph of light transmission of the exemplary embodiment of a liquid crystal display device according to the invention and the comparative example of the liquid crystal display device.

FIG. 6 provides a graph of absolute transmittance A and B of the LCD devices (A) and (B) of the exemplary embodiment according to the invention and the comparative example, respectively.

Referring to Table 1 and FIG. 6, the exemplary embodiment of the LCD device according to the invention has the maximum absolute transmittance of about 4.13% at about 5.2 V, whereas comparative example of the LCD device has a maximum absolute transmittance of about 3.68% at about 5.2 V. Thus, the exemplary embodiment of the LCD device according to the invention has improved transmittance of about 13.3% as compared to the comparative example of the LCD device.

Hereinafter, another exemplary embodiment of an LCD according to the invention will be provided with reference to FIG. 7.

Figure 7:
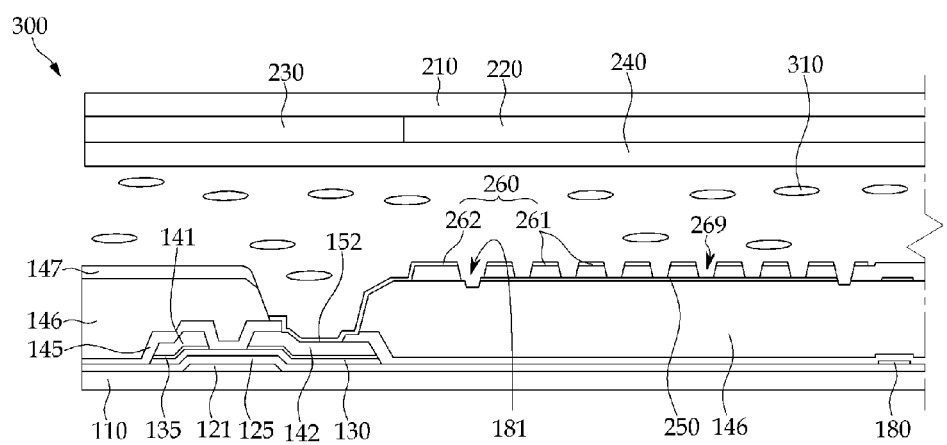
FIG. 7 is a cross-sectional view showing another exemplary embodiment of a liquid crystal display device according to the invention.

FIG. 7 is a cross-sectional view showing an exemplary embodiment of an LCD device 300 according to the invention. In the LCD device 300, a first electrode 250 acts as a common electrode and a second electrode 260 acts as a pixel electrode.

According to the exemplary embodiment of the invention, the LCD device 300 includes a gate line 120, a gate electrode 121, a common line 170, a contact electrode 175, a data line 180, a source electrode 141 and a drain electrode 142 on a first substrate 110 as in the above-described LCD device 100 illustrated in FIGS. 1 and 2.

A passivation layer 145 is disposed on the entire surface of the first substrate 110 including the gate line 120, the common line 170, the data line 180, a TFT and the contact electrode 175, and a planarization layer 146 is disposed on the passivation layer 145.

The first electrode 250 is disposed on the planarization layer 146. The first electrode 250 has a planar shape and is coupled to the common line 170.

An insulating layer 147 is disposed on the first electrode 250 and the second electrode 260 is disposed on the insulating layer 147. A contact hole 152 is defined In the passivation layer 145, the planarization layer 146 and the insulating layer 147 and exposes the drain electrode 142. The second electrode 260 is coupled to the drain electrode 142 of the TFT via the contact hole 152.

The second electrode 260 overlaps at least a part of the first electrode 250 and includes a plurality of branch electrodes 261. A cutout portion 269 is defined between adjacent branch electrodes 261 of the second electrode 260. A plurality of cutout portions 269 are disposed in an area corresponding to the first electrode 250 and also in another area outside the first electrode 250.

The second electrode 260 further includes a longitudinal coupling portion 262 placed extended along a length direction of the branch electrode 261. One end or edge portion of the first electrode 250 is disposed between at least one of the branch electrodes 261, such as an outermost branch electrode 261, and the longitudinal coupling portion 262. An electric field may be generated between the first electrode 250 and the longitudinal coupling portion 262 by interaction thereof.

Hereinafter, an exemplary embodiment of a process of manufacturing the LCD device illustrated in FIGS. 1 and 2, according to the invention, will be fully described with reference to FIGS. 8A to 8F.

Figure 8A:
FIGS. 8A to 8F are cross-sectional views showing an exemplary embodiment of a manufacturing process of a liquid crystal display device according to the invention.

As illustrated in FIG. 8A, the gate electrode 121 is formed on the first substrate 110 which includes transparent glass, plastic, or the like. The gate electrode 121 is formed together with the gate line 120. The gate insulating layer 125 including silicon nitride (SiNx) or silicon oxide (SiOx) is formed on the gate electrode 121 and the gate line 120.

Figure 8B:

As illustrated in FIG. 8B, the semiconductor layer 130 is formed on the gate insulating layer 125 to overlap at least a part of the gate electrode 121. The data line 180, the source electrode 141 and the drain electrode 142 including a conducting material are formed on the semiconductor layer 130 and the gate insulating layer 125. The common line 170 and the contact electrode 175 are also formed in forming the data line 180, the source electrode 141 and the drain electrode 142. The common line 170, the contact electrode 175, data line 180, the source electrode 141 and the drain electrode 142 may be formed in a same layer and from a same material as each other.

The ohmic contact layer 135 is formed between the semiconductor layer 130 and the source electrode 141 and between the semiconductor layer 130 and the drain electrode 142.

Figure 8C:
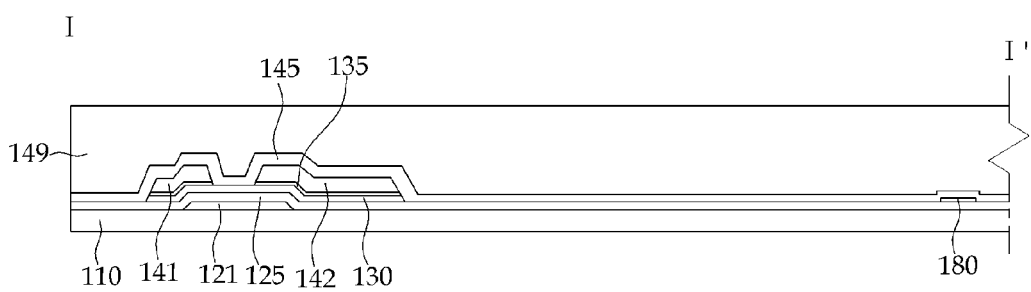

As illustrated in FIG. 8C, the passivation layer 145 is formed on the source electrode 141, the drain electrode 142 the exposed portion of semiconductor layer 130, the data line 180, the common line 170, and the contact electrode 175, and a planarization layer-forming material 149 is formed on the passivation layer 145.

Figure 8D:
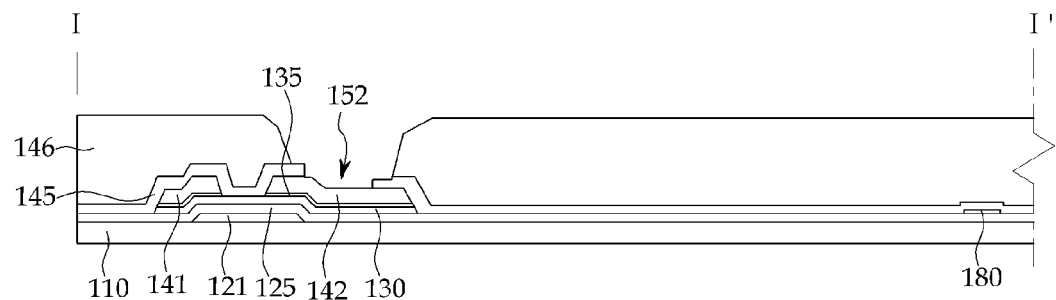

As illustrated in FIG. 8D, the planarization layer-forming material 149 is patterned and the passivation layer 145 thereunder is partly removed in a selective manner so that the contact hole 152 is formed to expose the drain electrode 142. The contact electrode 175 coupled to the common line 170 is also partly exposed in the patterning of the planarization layer-forming material 149.

Figure 8E:
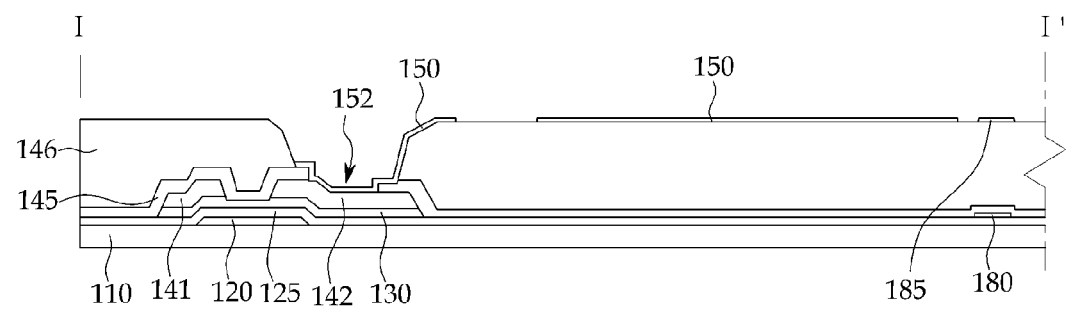

As illustrated in FIG. 8E, the first electrode 150 is formed on the planarization layer 146 to be coupled to the drain electrode 142 via the contact hole 152. The shielding layer 185 is formed on the data line 180. The shielding layer 185 may be formed of the same material and in a same layer as the first electrode 150 by the same process. The forming the first electrode 150 and the shielding layer 185 exposes a portion of the planarization layer 146.

Figure 8F:
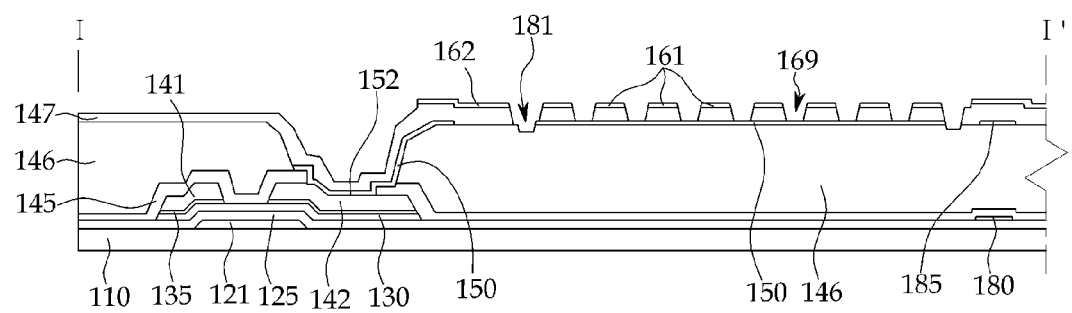

As illustrated in FIG. 8F, the insulating layer 147 is formed on the first electrode 150 and the exposed a portion of the planarization layer 146, and the second electrode 160 is formed on the insulating layer 147. For connection between the second electrode 160 and the contact electrode 175, a contact hole is formed by partly removing the insulating layer 147 to expose the contact electrode 175.

In order to form the second electrode 160 including a plurality of branch electrodes 161, a second electrode-forming material is applied on the entire insulating layer 147, and the second electrode-forming material is selectively removed, thereby forming a plurality of cutout portions 169. The cutout portions 169 may also be formed in an area that does not overlap the first electrode 150.

Portions of the insulating layer 147 are removed in the process of forming the cutout portions 169. Portions of the planarization layer 146 not overlapped by and exposed by the first electrode 150 is also partially removed in the process of forming the cutout portions 169. Removing the portions of the exposed planarization layer 146 forms the exposed portion 181 of the planarization layer 146 which does not overlap the first electrode 150. Consequently, the exposed portion 181 has a shape of a groove that is recessed from the upper surface of the planarization layer 146.

Referring again to FIGS. 1 and 2, the color filter 220 and the black matrix 230 are formed on the second substrate 210, and the insulating layer 240 is formed on the color filter 220 and the black matrix 230. The liquid crystal 310 is arranged between the first and second substrates 110 and 210 with the spacer (not shown) interposed therebetween, and the first and second display substrates including the first and second substrates 110 and 210 are bonded to each other, so that the LCD device illustrated in FIG. 2 is manufactured.

From the foregoing, it will be appreciated that various exemplary embodiments of the invention have been described herein for purposes of illustration, and that various modifications may be made without departing from the scope and spirit of the invention. Accordingly, the various exemplary embodiments disclosed herein are not intended to be limiting, with the true scope and spirit being indicated by the following claims, and equivalents thereof.

What is claimed is:

1. A liquid crystal display device comprising:
    a first substrate;
    a first electrode on the first substrate;
    a planarization layer which is between the first substrate and the first electrode; and
    a second electrode on the first substrate, spaced apart from the first electrode and overlapping at least a part of the first electrode,
    wherein
    the second electrode comprises a plurality of branch electrodes, and a coupling portion which couples the plurality of branch electrodes to each other,
    the coupling portion comprises a longitudinal coupling portion formed extended in a length direction of the branch electrodes, and a transverse coupling portion extended in a width direction of the branch electrodes, and
    in a plan view,
        an edge portion of the first electrode is disposed between a branch electrode among the plurality of branch electrodes and the longitudinal coupling portion,
        the first electrode exposes a portion of the planarization layer between the longitudinal coupling portion and the branch electrode, and
        the exposed portion of the planarization layer does not overlap the first electrode.

2. The liquid crystal display device of claim 1, wherein the exposed portion of the planarization layer has a concave groove cross-section shape.

3. The liquid crystal display device of claim 2, wherein a depth of the groove is about 0.1 micrometer to about 0.3 micrometer with respect to an upper surface of the planarization layer.

4. The liquid crystal display device of claim 1, wherein a cross-sectional thickness of the planarization layer is about 1.5 micrometers to about 3 micrometers.

5. The liquid crystal display device of claim 1, further comprising:
    a data line on the first substrate, and
    a shielding layer on the planarization layer and overlapping the data line.

6. The liquid crystal display device of claim 5, wherein the shielding layer comprises a same material as the first electrode.

7. The liquid crystal display device of claim 1, wherein the first electrode is a pixel electrode and the second electrode is a common electrode.

8. The liquid crystal display device of claim 1, further comprising a thin film transistor on the first substrate,
    wherein the thin film transistor is coupled to the first electrode.

9. A method of manufacturing a liquid crystal display device, the method comprising:
    forming a first electrode on a first substrate;
    forming a second electrode on the first electrode and spaced apart from the first electrode; and
    forming a planarization layer which is between the first substrate and the first electrode and provides a planar surface for an entirety of the first electrode,
    wherein
    the second electrode comprises a plurality of branch electrodes, and a coupling portion which couples the plurality of branch electrodes to each other,
    the coupling portion comprises a longitudinal coupling portion formed extended in a length direction of the branch electrodes, and a transverse coupling portion formed extended in a width direction of the branch electrodes, and
    in a plan view,
        an edge portion of the first electrode is disposed between a branch electrode among the plurality of branch electrodes and the longitudinal coupling portion,
        the first electrode exposes a portion of the planarization layer between the longitudinal coupling portion and the branch electrode, and
        the exposed portion of the planarization layer does not overlap the first electrode.

10. The method of claim 9, wherein the forming the second electrode comprises:
    applying a second electrode-forming material on the first electrode and insulated from the first electrode; and
    selectively removing a portion of the second electrode-forming material to form a cutout portion at the edge portion of the first electrode.

11. The method of claim 9, wherein the exposed portion of the planarization layer is formed to have a concave groove cross-section shape.

12. The method of claim 9, further comprising forming a data line on the first substrate before the forming the first electrode,
  wherein the forming the first electrode comprises forming a shielding layer on the planarization layer and overlapping the data line.

* * * * *